US012613134B2

(12) United States Patent
Cheng et al.

(10) Patent No.: US 12,613,134 B2
(45) Date of Patent: Apr. 28, 2026

(54) SYSTEM AND METHOD FOR COLOR SENSOR CHARACTERIZATION, CALIBRATION AND THRESHOLD-SETTING

(71) Applicant: Covidien LP, Mansfield, MA (US)

(72) Inventors: Jiqi Cheng, North Haven, CT (US); Nathaniel A. Breiter, North Haven, CT (US)

(73) Assignee: Covidien LP, Mansfield, MA (US)

( * ) Notice: Subject to any disclaimer, the term of this patent is extended or adjusted under 35 U.S.C. 154(b) by 389 days.

(21) Appl. No.: 18/124,361

(22) Filed: Mar. 21, 2023

(65) Prior Publication Data

US 2023/0314215 A1    Oct. 5, 2023

Related U.S. Application Data

(60) Provisional application No. 63/325,781, filed on Mar. 31, 2022.

(51) Int. Cl.
| | |
|---|---|
| *G01J 3/46* | (2006.01) |
| *G01J 3/02* | (2006.01) |
| *G01J 3/50* | (2006.01) |

(52) U.S. Cl.
CPC ............. *G01J 3/0297* (2013.01); *G01J 3/505* (2013.01)

(58) Field of Classification Search
CPC ........... G01J 3/0297; G01J 3/505; G01J 3/501
USPC ........................................................ 382/167
See application file for complete search history.

(56) References Cited

U.S. PATENT DOCUMENTS

| | | | |
|---|---|---|---|
| 37,165 | A | 12/1862 | Gary |
| 3,209,754 | A | 10/1965 | Brown |
| 3,273,562 | A | 9/1966 | Brown |
| 3,499,591 | A | 3/1970 | Green |
| 3,528,693 | A | 9/1970 | Pearson et al. |
| 3,744,495 | A | 7/1973 | Johnson |
| 3,862,631 | A | 1/1975 | Austin |
| 3,949,924 | A | 4/1976 | Green |
| 4,060,089 | A | 11/1977 | Noiles |
| 4,204,623 | A | 5/1980 | Green |
| 4,217,902 | A | 8/1980 | March |
| 4,263,903 | A | 4/1981 | Griggs |

(Continued)

FOREIGN PATENT DOCUMENTS

| | | |
|---|---|---|
| CA | 2848855 A1 | 10/2015 |
| CN | 101683284 A | 3/2010 |

(Continued)

OTHER PUBLICATIONS

Maumita Chakrabarti et al, "Monte Carlo Analysis of Multicolour LED Light Engine", ResearchGate, Jul. 15, 2015 (Year: 2015).*

(Continued)

*Primary Examiner* — Jamares Q Washington
(74) *Attorney, Agent, or Firm* — Carter, DeLuca & Farrell, LLP

(57) ABSTRACT

A method for generating a calibration parameter for light sources includes activating at least one LED of a plurality of multicolor LEDs of a light source and measuring a color of the at least one LED in a first color space. The method also includes scaling the color of the at least one LED relative to the plurality of multicolor LEDs, obtaining a plurality of scaled color measurements, and calculating a calibration matrix based on the plurality of scaled color measurements.

20 Claims, 8 Drawing Sheets

(56)  References Cited

U.S. PATENT DOCUMENTS

| | | | |
|---|---|---|---|
| 4,275,813 A | 6/1981 | Noiles |
| 4,331,277 A | 5/1982 | Green |
| 4,428,376 A | 1/1984 | Mericle |
| 4,429,695 A | 2/1984 | Green |
| 4,444,181 A | 4/1984 | Wevers et al. |
| 4,454,875 A | 6/1984 | Pratt et al. |
| 4,456,006 A | 6/1984 | Wevers et al. |
| 4,485,816 A | 12/1984 | Krumme |
| 4,485,817 A | 12/1984 | Swiggett |
| 4,488,523 A | 12/1984 | Shichman |
| 4,508,253 A | 4/1985 | Green |
| 4,508,523 A | 4/1985 | Leu |
| 4,522,206 A | 6/1985 | Whipple et al. |
| 4,534,350 A | 8/1985 | Golden et al. |
| 4,535,772 A | 8/1985 | Sheehan |
| 4,566,620 A | 1/1986 | Green et al. |
| 4,570,623 A | 2/1986 | Ellison et al. |
| 4,606,343 A | 8/1986 | Conta et al. |
| 4,606,344 A | 8/1986 | Di Giovanni |
| 4,610,383 A | 9/1986 | Rothfuss et al. |
| 4,612,923 A | 9/1986 | Kronenthal |
| 4,612,933 A | 9/1986 | Brinkerhoff et al. |
| D286,442 S | 10/1986 | Korthoff et al. |
| 4,627,437 A | 12/1986 | Bedi et al. |
| 4,635,637 A | 1/1987 | Schreiber |
| 4,662,371 A | 5/1987 | Whipple et al. |
| 4,671,280 A | 6/1987 | Dorband et al. |
| 4,705,038 A | 11/1987 | Sjostrom et al. |
| 4,712,550 A | 12/1987 | Sinnett |
| 4,719,917 A | 1/1988 | Barrows et al. |
| 4,724,839 A | 2/1988 | Bedi et al. |
| 4,731,058 A | 3/1988 | Doan |
| 4,805,617 A | 2/1989 | Bedi et al. |
| 4,807,628 A | 2/1989 | Peters et al. |
| 4,852,558 A | 8/1989 | Outerbridge |
| 4,913,144 A | 4/1990 | Del Medico |
| 4,960,420 A | 10/1990 | Goble et al. |
| 4,962,877 A | 10/1990 | Hervas |
| 4,990,153 A | 2/1991 | Richards |
| 4,994,073 A | 2/1991 | Green |
| 4,995,877 A | 2/1991 | Ams et al. |
| 5,040,715 A | 8/1991 | Green et al. |
| 5,065,929 A | 11/1991 | Schulze et al. |
| 5,089,009 A | 2/1992 | Green |
| 5,108,422 A | 4/1992 | Green et al. |
| 5,114,399 A | 5/1992 | Kovalcheck |
| 5,129,570 A | 7/1992 | Schulze et al. |
| 5,143,453 A | 9/1992 | Weynant |
| 5,203,864 A | 4/1993 | Phillips |
| 5,207,697 A | 5/1993 | Carusillo et al. |
| 5,209,756 A | 5/1993 | Seedhom et al. |
| 5,246,443 A | 9/1993 | Mai |
| 5,258,008 A | 11/1993 | Wilk |
| 5,271,543 A | 12/1993 | Grant et al. |
| RE34,519 E | 1/1994 | Fox et al. |
| 5,282,829 A | 2/1994 | Hermes |
| 5,300,081 A | 4/1994 | Young et al. |
| 5,307,976 A | 5/1994 | Olson et al. |
| 5,312,023 A | 5/1994 | Green et al. |
| 5,312,024 A | 5/1994 | Grant et al. |
| 5,313,935 A | 5/1994 | Kortenbach et al. |
| 5,318,221 A | 6/1994 | Green et al. |
| 5,326,013 A | 7/1994 | Green et al. |
| 5,330,486 A | 7/1994 | Wilk |
| 5,332,142 A | 7/1994 | Robinson et al. |
| 5,342,376 A | 8/1994 | Ruff |
| 5,350,355 A | 9/1994 | Sklar |
| 5,356,064 A | 10/1994 | Green et al. |
| 5,359,993 A | 11/1994 | Slater et al. |
| 5,364,001 A | 11/1994 | Bryan |
| 5,381,943 A | 1/1995 | Allen et al. |
| 5,383,874 A | 1/1995 | Jackson et al. |
| 5,383,880 A | 1/1995 | Hooven |
| 5,389,098 A | 2/1995 | Tsuruta et al. |
| 5,391,166 A | 2/1995 | Eggers |
| 5,395,030 A | 3/1995 | Kuramoto et al. |
| 5,395,033 A | 3/1995 | Byrne et al. |
| 5,400,267 A | 3/1995 | Denen et al. |
| 5,403,312 A | 4/1995 | Yates et al. |
| 5,405,344 A | 4/1995 | Williamson et al. |
| 5,411,508 A | 5/1995 | Bessler et al. |
| 5,413,267 A | 5/1995 | Solyntjes et al. |
| 5,431,323 A | 7/1995 | Smith et al. |
| 5,464,144 A | 11/1995 | Guy et al. |
| 5,467,911 A | 11/1995 | Tsuruta et al. |
| 5,478,344 A | 12/1995 | Stone et al. |
| 5,482,100 A | 1/1996 | Kuhar |
| 5,485,947 A | 1/1996 | Olson et al. |
| 5,487,499 A | 1/1996 | Sorrentino et al. |
| 5,497,933 A | 3/1996 | DeFonzo et al. |
| 5,500,000 A | 3/1996 | Feagin et al. |
| 5,503,320 A | 4/1996 | Webster et al. |
| 5,507,743 A | 4/1996 | Edwards et al. |
| 5,518,163 A | 5/1996 | Hooven |
| 5,518,164 A | 5/1996 | Hooven |
| 5,526,822 A | 6/1996 | Burbank et al. |
| 5,529,235 A | 6/1996 | Boiarski et al. |
| 5,531,744 A | 7/1996 | Nardella et al. |
| 5,533,661 A | 7/1996 | Main et al. |
| 5,535,934 A | 7/1996 | Boiarski et al. |
| 5,535,937 A | 7/1996 | Boiarski et al. |
| 5,558,671 A | 9/1996 | Yates |
| 5,560,532 A | 10/1996 | DeFonzo et al. |
| 5,562,239 A | 10/1996 | Boiarski et al. |
| 5,571,285 A | 11/1996 | Chow et al. |
| 5,575,799 A | 11/1996 | Bolanos et al. |
| 5,582,611 A | 12/1996 | Tsuruta et al. |
| 5,584,835 A | 12/1996 | Greenfield |
| 5,601,224 A | 2/1997 | Bishop et al. |
| 5,601,558 A | 2/1997 | Torrie et al. |
| 5,607,095 A | 3/1997 | Smith et al. |
| 5,609,285 A | 3/1997 | Grant et al. |
| 5,609,560 A | 3/1997 | Ichikawa et al. |
| 5,624,452 A | 4/1997 | Yates |
| 5,632,433 A | 5/1997 | Grant et al. |
| 5,634,926 A | 6/1997 | Jobe |
| 5,642,848 A | 7/1997 | Ludwig et al. |
| 5,653,374 A | 8/1997 | Young et al. |
| 5,658,300 A | 8/1997 | Bito et al. |
| 5,658,312 A | 8/1997 | Green et al. |
| 5,662,662 A | 9/1997 | Bishop et al. |
| 5,665,085 A | 9/1997 | Nardella |
| 5,667,513 A | 9/1997 | Torrie et al. |
| 5,667,517 A | 9/1997 | Hooven |
| 5,667,527 A | 9/1997 | Cook |
| 5,669,544 A | 9/1997 | Schulze et al. |
| 5,673,841 A | 10/1997 | Schulze et al. |
| 5,676,674 A | 10/1997 | Bolanos et al. |
| 5,680,981 A | 10/1997 | Mililli et al. |
| 5,680,982 A | 10/1997 | Schulze et al. |
| 5,690,675 A | 11/1997 | Sawyer et al. |
| 5,692,668 A | 12/1997 | Schulze et al. |
| 5,695,506 A | 12/1997 | Pike et al. |
| 5,695,524 A | 12/1997 | Kelley et al. |
| 5,702,447 A | 12/1997 | Walch et al. |
| 5,704,534 A | 1/1998 | Huitema et al. |
| 5,713,505 A | 2/1998 | Huitema |
| 5,713,896 A | 2/1998 | Nardella |
| 5,715,987 A | 2/1998 | Kelley et al. |
| 5,716,366 A | 2/1998 | Yates |
| 5,720,753 A | 2/1998 | Sander et al. |
| 5,725,529 A | 3/1998 | Nicholson et al. |
| 5,728,110 A | 3/1998 | Vidal et al. |
| 5,728,116 A | 3/1998 | Rosenman |
| 5,730,757 A | 3/1998 | Benetti et al. |
| 5,735,848 A | 4/1998 | Yates et al. |
| 5,738,474 A | 4/1998 | Blewett |
| 5,755,726 A | 5/1998 | Pratt et al. |
| 5,759,171 A | 6/1998 | Coelho et al. |
| 5,779,130 A | 7/1998 | Alesi et al. |
| 5,782,397 A | 7/1998 | Koukline |
| 5,785,713 A | 7/1998 | Jobe |
| 5,788,698 A | 8/1998 | Savornin |
| 5,810,811 A | 9/1998 | Yates et al. |

(56)          References Cited

U.S. PATENT DOCUMENTS

| | | | |
|---|---|---|---|
| 5,823,066 A | 10/1998 | Huitema et al. |
| 5,829,662 A | 11/1998 | Allen et al. |
| 5,830,121 A | 11/1998 | Enomoto et al. |
| 5,849,023 A | 12/1998 | Mericle |
| 5,849,028 A | 12/1998 | Chen |
| 5,855,311 A | 1/1999 | Hamblin et al. |
| 5,861,005 A | 1/1999 | Kontos |
| 5,865,361 A | 2/1999 | Milliman et al. |
| 5,876,401 A | 3/1999 | Schulze et al. |
| 5,891,156 A | 4/1999 | Gessner et al. |
| 5,893,813 A | 4/1999 | Yamamoto |
| 5,895,396 A | 4/1999 | Day et al. |
| 5,906,607 A | 5/1999 | Taylor et al. |
| 5,911,721 A | 6/1999 | Nicholson et al. |
| 5,918,791 A | 7/1999 | Sorrentino et al. |
| 5,928,222 A | 7/1999 | Kleinerman |
| 5,944,717 A | 8/1999 | Lee et al. |
| 5,944,736 A | 8/1999 | Taylor et al. |
| 5,954,259 A | 9/1999 | Viola et al. |
| 5,961,521 A | 10/1999 | Roger |
| 5,964,394 A | 10/1999 | Robertson |
| 5,968,044 A | 10/1999 | Nicholson et al. |
| 5,976,171 A | 11/1999 | Taylor |
| 5,980,518 A | 11/1999 | Carr et al. |
| 5,980,548 A | 11/1999 | Evans et al. |
| 5,991,355 A | 11/1999 | Dahlke |
| 5,991,650 A | 11/1999 | Swanson et al. |
| 5,992,724 A | 11/1999 | Snyder |
| 5,997,552 A | 12/1999 | Person et al. |
| 6,004,335 A | 12/1999 | Vaitekunas et al. |
| 6,007,550 A | 12/1999 | Wang et al. |
| 6,010,054 A | 1/2000 | Johnson et al. |
| 6,013,077 A | 1/2000 | Harwin |
| 6,015,417 A | 1/2000 | Reynolds, Jr. |
| 6,017,354 A | 1/2000 | Culp et al. |
| 6,030,410 A | 2/2000 | Zurbrugg |
| 6,032,849 A | 3/2000 | Mastri et al. |
| 6,039,731 A | 3/2000 | Taylor et al. |
| 6,051,007 A | 4/2000 | Hogendijk et al. |
| 6,063,078 A | 5/2000 | Wittkampf |
| 6,063,095 A | 5/2000 | Wang et al. |
| 6,077,246 A | 6/2000 | Kullas et al. |
| 6,079,606 A | 6/2000 | Milliman et al. |
| 6,080,150 A | 6/2000 | Gough |
| 6,083,242 A | 7/2000 | Cook |
| 6,090,123 A | 7/2000 | Culp et al. |
| 6,092,422 A | 7/2000 | Binnig et al. |
| 6,109,500 A | 8/2000 | Alli et al. |
| 6,113,592 A | 9/2000 | Taylor |
| 6,123,702 A | 9/2000 | Swanson et al. |
| H1904 H | 10/2000 | Yates et al. |
| 6,126,058 A | 10/2000 | Adams et al. |
| 6,126,651 A | 10/2000 | Mayer |
| 6,127,811 A | 10/2000 | Shenoy et al. |
| 6,132,425 A | 10/2000 | Gough |
| 6,165,169 A | 12/2000 | Panescu et al. |
| 6,166,538 A | 12/2000 | D'Alfonso |
| 6,179,840 B1 | 1/2001 | Bowman |
| 6,187,009 B1 | 2/2001 | Herzog et al. |
| 6,187,019 B1 | 2/2001 | Stefanchik et al. |
| 6,190,401 B1 | 2/2001 | Green et al. |
| 6,193,501 B1 | 2/2001 | Masel et al. |
| 6,202,914 B1 | 3/2001 | Geiste et al. |
| 6,217,573 B1 | 4/2001 | Webster |
| 6,228,534 B1 | 5/2001 | Takeuchi et al. |
| 6,231,565 B1 | 5/2001 | Tovey et al. |
| 6,236,874 B1 | 5/2001 | Devlin et al. |
| 6,237,604 B1 | 5/2001 | Burnside et al. |
| 6,241,139 B1 | 6/2001 | Milliman et al. |
| 6,245,065 B1 | 6/2001 | Panescu et al. |
| 6,248,117 B1 | 6/2001 | Blatter |
| 6,250,532 B1 | 6/2001 | Green et al. |
| 6,258,111 B1 | 7/2001 | Ross et al. |
| 6,264,086 B1 | 7/2001 | McGuckin, Jr. |
| 6,264,087 B1 | 7/2001 | Whitman |
| 6,264,653 B1 | 7/2001 | Falwell |
| 6,281,471 B1 | 8/2001 | Smart |
| 6,288,534 B1 | 9/2001 | Starkweather et al. |
| 6,290,701 B1 | 9/2001 | Enayati |
| 6,293,943 B1 | 9/2001 | Panescu et al. |
| 6,295,330 B1 | 9/2001 | Skog et al. |
| 6,315,184 B1 | 11/2001 | Whitman |
| 6,329,778 B1 | 12/2001 | Culp et al. |
| 6,330,965 B1 | 12/2001 | Milliman et al. |
| 6,346,104 B2 | 2/2002 | Daly et al. |
| 6,355,066 B1 | 3/2002 | Kim |
| 6,364,884 B1 | 4/2002 | Bowman et al. |
| 6,387,092 B1 | 5/2002 | Burnside et al. |
| 6,388,240 B2 | 5/2002 | Schulz et al. |
| 6,402,766 B2 | 6/2002 | Bowman et al. |
| H2037 H | 7/2002 | Yates et al. |
| 6,412,279 B1 | 7/2002 | Coleman et al. |
| 6,425,903 B1 | 7/2002 | Voegele |
| 6,436,097 B1 | 8/2002 | Nardella |
| 6,436,107 B1 | 8/2002 | Wang et al. |
| 6,436,110 B2 | 8/2002 | Bowman et al. |
| 6,443,973 B1 | 9/2002 | Whitman |
| 6,447,517 B1 | 9/2002 | Bowman |
| 6,461,372 B1 | 10/2002 | Jensen et al. |
| 6,478,210 B2 | 11/2002 | Adams et al. |
| 6,497,707 B1 | 12/2002 | Bowman et al. |
| 6,505,768 B2 | 1/2003 | Whitman |
| 6,515,273 B2 | 2/2003 | Ai-Ali |
| 6,524,316 B1 | 2/2003 | Nicholson et al. |
| 6,533,157 B1 | 3/2003 | Whitman |
| 6,540,751 B2 | 4/2003 | Enayati |
| 6,544,273 B1 | 4/2003 | Harari et al. |
| 6,554,852 B1 | 4/2003 | Oberlander |
| 6,562,071 B2 | 5/2003 | Jarvinen |
| 6,578,579 B2 | 6/2003 | Burnside et al. |
| 6,601,748 B1 | 8/2003 | Fung et al. |
| 6,601,749 B2 | 8/2003 | Sullivan et al. |
| 6,602,252 B2 | 8/2003 | Mollenauer |
| 6,611,793 B1 | 8/2003 | Burnside et al. |
| 6,616,821 B2 | 9/2003 | Broadley et al. |
| 6,629,986 B1 | 10/2003 | Ross et al. |
| 6,651,669 B1 | 11/2003 | Burnside |
| 6,656,177 B2 | 12/2003 | Truckai et al. |
| 6,669,073 B2 | 12/2003 | Milliman et al. |
| 6,669,705 B2 | 12/2003 | Westhaver et al. |
| 6,696,008 B2 | 2/2004 | Brandinger |
| 6,698,643 B2 | 3/2004 | Whitman |
| 6,699,177 B1 | 3/2004 | Wang et al. |
| 6,716,233 B1 | 4/2004 | Whitman |
| 6,736,085 B1 | 5/2004 | Esnouf |
| 6,792,390 B1 | 9/2004 | Burnside et al. |
| 6,793,652 B1 | 9/2004 | Whitman et al. |
| 6,817,508 B1 | 11/2004 | Racenet et al. |
| 6,830,174 B2 | 12/2004 | Hillstead et al. |
| 6,843,403 B2 | 1/2005 | Whitman |
| 6,846,307 B2 | 1/2005 | Whitman et al. |
| 6,846,308 B2 | 1/2005 | Whitman et al. |
| 6,846,309 B2 | 1/2005 | Whitman et al. |
| 6,849,071 B2 | 2/2005 | Whitman et al. |
| 6,861,639 B2 | 3/2005 | Al-Ali |
| 6,872,214 B2 | 3/2005 | Sonnenschein et al. |
| 6,899,538 B2 | 5/2005 | Matoba |
| 6,900,004 B2 | 5/2005 | Satake |
| 6,905,057 B2 | 6/2005 | Swayze et al. |
| 6,926,636 B2 | 8/2005 | Luper |
| 6,953,139 B2 | 10/2005 | Milliman et al. |
| 6,959,852 B2 | 11/2005 | Shelton, IV et al. |
| 6,964,363 B2 | 11/2005 | Wales et al. |
| 6,979,328 B2 | 12/2005 | Baerveldt et al. |
| 6,981,628 B2 | 1/2006 | Wales |
| 6,981,941 B2 | 1/2006 | Whitman et al. |
| 6,988,649 B2 | 1/2006 | Shelton, IV et al. |
| 7,000,819 B2 | 2/2006 | Swayze et al. |
| 7,032,798 B2 | 4/2006 | Whitman et al. |
| 7,044,353 B2 | 5/2006 | Mastri et al. |
| 7,048,687 B1 | 5/2006 | Reuss et al. |
| 7,055,731 B2 | 6/2006 | Shelton, IV et al. |
| 7,059,508 B2 | 6/2006 | Shelton, IV et al. |
| 7,077,856 B2 | 7/2006 | Whitman |

(56)　　　　　　References Cited

U.S. PATENT DOCUMENTS

| | | |
|---|---|---|
| 7,083,075 B2 | 8/2006 | Swayze et al. |
| 7,097,089 B2 | 8/2006 | Marczyk |
| 7,111,769 B2 | 9/2006 | Wales et al. |
| 7,118,564 B2 | 10/2006 | Ritchie et al. |
| 7,122,029 B2 | 10/2006 | Koop et al. |
| 7,128,253 B2 | 10/2006 | Mastri et al. |
| 7,128,254 B2 | 10/2006 | Shelton, IV et al. |
| 7,140,528 B2 | 11/2006 | Shelton, IV |
| 7,143,924 B2 | 12/2006 | Scirica et al. |
| 7,143,925 B2 | 12/2006 | Shelton, IV et al. |
| 7,143,926 B2 | 12/2006 | Shelton, IV et al. |
| 7,147,138 B2 | 12/2006 | Shelton, IV |
| 7,186,966 B2 | 3/2007 | Al-Ali |
| 7,193,519 B2 | 3/2007 | Root et al. |
| 7,217,269 B2 | 5/2007 | El-Galley et al. |
| 7,220,232 B2 | 5/2007 | Suorsa et al. |
| 7,240,817 B2 | 7/2007 | Higuchi |
| 7,241,270 B2 | 7/2007 | Horzewski et al. |
| 7,246,734 B2 | 7/2007 | Shelton, IV |
| 7,303,108 B2 | 12/2007 | Shelton, IV |
| 7,328,828 B2 | 2/2008 | Ortiz et al. |
| 7,335,169 B2 | 2/2008 | Thompson et al. |
| 7,364,061 B2 | 4/2008 | Swayze et al. |
| 7,380,695 B2 | 6/2008 | Doll et al. |
| 7,380,696 B2 | 6/2008 | Shelton, IV et al. |
| 7,404,508 B2 | 7/2008 | Smith et al. |
| 7,416,101 B2 | 8/2008 | Shelton, IV et al. |
| 7,419,080 B2 | 9/2008 | Smith et al. |
| 7,422,136 B1 | 9/2008 | Marczyk |
| 7,422,139 B2 | 9/2008 | Shelton, IV et al. |
| 7,431,188 B1 | 10/2008 | Marczyk |
| 7,431,189 B2 | 10/2008 | Shelton, IV et al. |
| 7,434,715 B2 | 10/2008 | Shelton, IV et al. |
| 7,441,684 B2 | 10/2008 | Shelton, IV et al. |
| 7,448,525 B2 | 11/2008 | Shelton, IV et al. |
| 7,461,767 B2 | 12/2008 | Viola et al. |
| 7,464,846 B2 | 12/2008 | Shelton, IV et al. |
| 7,464,847 B2 | 12/2008 | Viola et al. |
| 7,464,849 B2 | 12/2008 | Shelton, IV et al. |
| 7,481,348 B2 | 1/2009 | Marczyk |
| 7,487,899 B2 | 2/2009 | Shelton, IV et al. |
| 7,549,563 B2 | 6/2009 | Mather et al. |
| 7,552,854 B2 | 6/2009 | Wixey et al. |
| 7,556,185 B2 | 7/2009 | Viola |
| 7,568,603 B2 | 8/2009 | Shelton, IV et al. |
| 7,637,409 B2 | 12/2009 | Marczyk |
| 7,641,093 B2 | 1/2010 | Doll et al. |
| 7,644,848 B2 | 1/2010 | Swayze et al. |
| 7,648,055 B2 | 1/2010 | Marczyk |
| 7,670,334 B2 | 3/2010 | Hueil et al. |
| 7,694,809 B2 | 4/2010 | Garbini et al. |
| 7,721,931 B2 | 5/2010 | Shelton, IV et al. |
| 7,740,159 B2 | 6/2010 | Shelton, IV et al. |
| 7,753,248 B2 | 7/2010 | Viola |
| 7,757,925 B2 | 7/2010 | Viola et al. |
| 7,766,207 B2 | 8/2010 | Mather et al. |
| 7,766,210 B2 | 8/2010 | Shelton, IV et al. |
| 7,770,775 B2 | 8/2010 | Shelton, IV et al. |
| 7,784,663 B2 | 8/2010 | Shelton, IV |
| 7,815,090 B2 | 10/2010 | Marczyk |
| 7,823,760 B2 | 11/2010 | Zemlok et al. |
| 7,845,534 B2 | 12/2010 | Viola et al. |
| 7,870,989 B2 | 1/2011 | Viola et al. |
| 7,886,953 B2 | 2/2011 | Schwemberger et al. |
| 7,887,530 B2 | 2/2011 | Zemlok et al. |
| 7,905,897 B2 | 3/2011 | Whitman et al. |
| 7,909,221 B2 | 3/2011 | Viola et al. |
| 7,922,063 B2 | 4/2011 | Zemlok et al. |
| 7,931,660 B2 | 4/2011 | Aranyi et al. |
| 7,950,560 B2 | 5/2011 | Zemlok et al. |
| 7,955,352 B2 | 6/2011 | McEwen et al. |
| 8,006,885 B2 | 8/2011 | Marczyk |
| 8,006,887 B2 | 8/2011 | Marczyk |
| 8,011,551 B2 | 9/2011 | Marczyk et al. |
| 8,020,742 B2 | 9/2011 | Marczyk |
| 8,025,199 B2 | 9/2011 | Whitman et al. |
| 8,038,044 B2 | 10/2011 | Viola |
| 8,052,024 B2 | 11/2011 | Viola et al. |
| 8,066,721 B2 | 11/2011 | Kortenbach et al. |
| 8,074,858 B2 | 12/2011 | Marczyk |
| 8,092,493 B2 | 1/2012 | Marczyk |
| 8,128,645 B2 | 3/2012 | Sonnenschein et al. |
| 8,132,705 B2 | 3/2012 | Viola et al. |
| 8,157,150 B2 | 4/2012 | Viola et al. |
| 8,186,555 B2 | 5/2012 | Shelton, IV et al. |
| 8,201,721 B2 | 6/2012 | Zemlok et al. |
| 8,210,412 B2 | 7/2012 | Marczyk |
| 8,240,536 B2 | 8/2012 | Marczyk |
| 8,240,537 B2 | 8/2012 | Marczyk |
| 8,267,924 B2 | 9/2012 | Zemlok et al. |
| 8,328,823 B2 | 12/2012 | Aranyi et al. |
| 8,348,125 B2 | 1/2013 | Viola et al. |
| 8,405,674 B2 | 3/2013 | Sakai et al. |
| 8,685,004 B2 | 4/2014 | Zemlock et al. |
| 8,708,560 B2 | 4/2014 | Kraemer |
| 8,711,136 B2 | 4/2014 | Park |
| 9,192,381 B2 | 11/2015 | Marczyk |
| 9,364,222 B2 | 6/2016 | Zemlok et al. |
| 9,370,360 B2 | 6/2016 | Marczyk |
| 9,370,361 B2 | 6/2016 | Viola et al. |
| 9,433,415 B2 | 9/2016 | Marczyk et al. |
| 9,480,492 B2 | 11/2016 | Aranyi et al. |
| 9,585,659 B2 | 3/2017 | Viola et al. |
| 10,492,814 B2 | 12/2019 | Snow et al. |
| 10,722,222 B2 | 7/2020 | Aranyi |
| 2002/0103489 A1 | 8/2002 | Ku |
| 2002/0111641 A1 | 8/2002 | Peterson et al. |
| 2002/0165541 A1 | 11/2002 | Whitman |
| 2003/0090201 A1 | 5/2003 | Peng |
| 2003/0114851 A1 | 6/2003 | Truckai et al. |
| 2003/0120306 A1 | 6/2003 | Burbank et al. |
| 2004/0232201 A1 | 11/2004 | Wenchell et al. |
| 2005/0006429 A1 | 1/2005 | Wales et al. |
| 2005/0010235 A1 | 1/2005 | VanDusseldorp |
| 2005/0131390 A1 | 6/2005 | Heinrich et al. |
| 2005/0139636 A1 | 6/2005 | Schwemberger et al. |
| 2005/0177176 A1 | 8/2005 | Gerbi et al. |
| 2005/0192609 A1 | 9/2005 | Whitman et al. |
| 2005/0247753 A1 | 11/2005 | Kelly et al. |
| 2006/0000867 A1 | 1/2006 | Shelton et al. |
| 2007/0023477 A1 | 2/2007 | Whitman et al. |
| 2007/0029363 A1 | 2/2007 | Popov |
| 2007/0084897 A1 | 4/2007 | Shelton et al. |
| 2007/0102472 A1 | 5/2007 | Shelton |
| 2007/0175949 A1 | 8/2007 | Shelton et al. |
| 2007/0175950 A1 | 8/2007 | Shelton et al. |
| 2007/0175951 A1 | 8/2007 | Shelton et al. |
| 2007/0175955 A1 | 8/2007 | Shelton et al. |
| 2007/0219563 A1 | 9/2007 | Voegele |
| 2008/0029570 A1 | 2/2008 | Shelton et al. |
| 2008/0029573 A1 | 2/2008 | Shelton et al. |
| 2008/0029574 A1 | 2/2008 | Shelton et al. |
| 2008/0029575 A1 | 2/2008 | Shelton et al. |
| 2008/0103714 A1 | 5/2008 | Aldrich et al. |
| 2008/0135600 A1 | 6/2008 | Hiranuma et al. |
| 2008/0169329 A1 | 7/2008 | Shelton et al. |
| 2008/0185419 A1 | 8/2008 | Smith et al. |
| 2008/0197167 A1 | 8/2008 | Viola et al. |
| 2008/0255413 A1 | 10/2008 | Zemlok et al. |
| 2008/0255607 A1 | 10/2008 | Zemlok |
| 2009/0018624 A1 | 1/2009 | Levinson et al. |
| 2009/0090201 A1 | 4/2009 | Viola |
| 2009/0090763 A1 | 4/2009 | Zemlok et al. |
| 2009/0127431 A1* | 5/2009 | Helbing .................... G01J 1/32 |
| | | 250/559.1 |
| 2010/0200636 A1 | 8/2010 | Zemlok et al. |
| 2010/0312257 A1 | 12/2010 | Aranyi |
| 2010/0320254 A1 | 12/2010 | Zemlok et al. |
| 2011/0034910 A1 | 2/2011 | Ross et al. |
| 2011/0062211 A1 | 3/2011 | Ross et al. |
| 2011/0168757 A1 | 7/2011 | Viola et al. |
| 2011/0172681 A1 | 7/2011 | Aranyi et al. |
| 2011/0190738 A1 | 8/2011 | Zemlok et al. |
| 2011/0301579 A1 | 12/2011 | Marczyk et al. |

(56) References Cited

U.S. PATENT DOCUMENTS

| | | | |
|---|---|---|---|
| 2011/0303735 A1 | 12/2011 | Marczyk | |
| 2012/0055972 A1 | 3/2012 | Marczyk | |
| 2012/0074197 A1 | 3/2012 | Marczyk | |
| 2012/0175400 A1 | 7/2012 | Viola et al. | |
| 2012/0193393 A1 | 8/2012 | Viola et al. | |
| 2012/0198288 A1 | 8/2012 | Njo et al. | |
| 2012/0220989 A1 | 8/2012 | Zemlok et al. | |
| 2012/0223121 A1 | 9/2012 | Viola et al. | |
| 2012/0241494 A1 | 9/2012 | Marczyk | |
| 2012/0277790 A1 | 11/2012 | Zemlok et al. | |
| 2012/0298718 A1 | 11/2012 | Marczyk | |
| 2012/0298720 A1 | 11/2012 | Marczyk | |
| 2015/0237688 A1* | 8/2015 | Gambeski | H05B 45/28 315/297 |
| 2019/0082516 A1* | 3/2019 | Wölfing | H05B 45/22 |
| 2021/0127467 A1* | 4/2021 | Slivka | H05B 45/22 |
| 2021/0205040 A1* | 7/2021 | Hassan | B25J 13/04 |

FOREIGN PATENT DOCUMENTS

| | | | |
|---|---|---|---|
| CN | 102648864 A | 8/2012 | |
| EP | 0537570 A2 | 4/1993 | |
| EP | 0647431 A2 | 4/1995 | |
| EP | 0738501 A1 | 10/1996 | |
| EP | 0770354 A1 | 5/1997 | |
| EP | 1070487 A2 | 1/2001 | |
| EP | 1201196 A1 | 5/2002 | |
| EP | 1658817 A1 | 5/2006 | |
| EP | 1813203 A2 | 8/2007 | |
| FR | 2849589 A1 | 7/2004 | |
| WO | 9414129 A1 | 6/1994 | |
| WO | 9729694 A1 | 8/1997 | |
| WO | 9740760 A1 | 11/1997 | |
| WO | 9837825 A1 | 9/1998 | |
| WO | 9952489 A1 | 10/1999 | |
| WO | 0234140 A2 | 5/2002 | |
| WO | 03026511 A1 | 4/2003 | |
| WO | 03030743 A2 | 4/2003 | |
| WO | 2004032760 A2 | 4/2004 | |
| WO | 2007030753 A2 | 3/2007 | |
| WO | 2007114868 A2 | 10/2007 | |
| WO | 2007118179 A2 | 10/2007 | |
| WO | 2007014355 A3 | 4/2009 | |
| WO | 2009143092 A1 | 11/2009 | |
| WO | WO-2015077493 A1 * | 5/2015 | G01J 3/501 |

OTHER PUBLICATIONS

Maumita Chakrabarti et al., "Monte Carlo Analysis of Multicolor LED Light Engine", ResearchGate, Jul. 15, 2015 (Year: 2015).*

Extended European Search Report issued in corresponding application EP 23165110.0 dated Jul. 20, 2023 (10 pages).

Detemple, P., "Microtechnology in Modern Health Care", Med Device Technol. 9(9):18-25 (1998).

Abridged Data Sheet, "DeepCover Secure Authenticator with 1-Wire SHA-256 and 512-Bit User EEPROM", Maxim Integrated Products, Inc. pp 1-4; 42; Dec. 2012.

Data Sheet "DS28E15-1—Sire SHA-256 Secure Authenticator with 512-Bit User EEPROM"; IC-ON-LINE, Electronic Component Manufacturers, pp. 1-2; Aug. 2013.

* cited by examiner

36

82

84

86

80

88

300 | Drive R, G, B led with PWM

302 | Read [R,G,B,W] 4 channels from light sensor

304 | Convert [R,G,B] readings to [H,S,V]

306 | Check thresholds for H, S and W

308 | Apply calibration to [R, G, B] and get [R*,G*,B*]

310 | Convert [R*,G*,B*] readings to [H*,S*,V*]

312 | Check thresholds for H*, S* and W

SYSTEM AND METHOD FOR COLOR SENSOR CHARACTERIZATION, CALIBRATION AND THRESHOLD-SETTING

CROSS-REFERENCE TO RELATED APPLICATION

The present application claims priority to and the benefit of U.S. Patent Provisional Application No. 63/325,781 filed on Mar. 31, 2022. The entire contents of the foregoing application are incorporated by reference herein.

BACKGROUND

Surgical robotic systems are currently being used in a variety of surgical procedures, including minimally invasive medical procedures. Some surgical robotic systems include a surgeon console controlling a surgical robotic arm and a surgical instrument having an end effector (e.g., forceps or grasping instrument) coupled to and actuated by the robotic arm. In operation, the robotic arm is moved to a position over a patient and then guides the surgical instrument into a small incision via a surgical port or a natural orifice of a patient to position the end effector at a work site within the patient's body.

At the surgeon console, the surgeon interacts with a robotic system to conduct the surgery. The surgeon console has a display displaying images of the surgical field captured by an endoscopic camera, input devices transferring motions made by the surgeon to the end effectors within the surgical field, and foot pedals configured to receive commands from the surgeon to activate devices and perform other functions of the surgical robotic arms. Multiple foot pedals may be used, which are labeled for their specific functions. In order to avoid confusion, and improve the visibility of the pedals, foot pedals are illuminated with light emitting diode (LED) lights. The LED lights generate different colors allowing the surgeon to differentiate between foot pedals. The present disclosure relates to improved systems and methods to systematically characterize the light sensor of the foot pedals and calibrate the readings from the light sensor in order to increase the manufacturing yield of the LEDs and components that utilize the LEDs.

SUMMARY

LEDs may be used in a surgical robotic system to generate different colors to distinguish different buttons or pedals. Foot pedals in a surgeon console are illuminated to provide better visibility. The foot pedals are used to activate energy delivery for monopolar or bipolar instruments, switch active robotic arms, or activate any other suitable function. The surgical robotic systems according to the present disclosure confirm the foot pedals are correctly illuminated. The foot pedal includes a color sensor disposed on a printed circuit board (PCB) along with the LEDs. The color sensor is configured to detect red, green and blue (R, G, B) lights in different channels. Some sensors may have multiple channels to detect all the lights together, i.e., as a white channel. The readings from the color sensor are expressed in RGB color space. Since it is relatively hard to do color classification directly in the RGB color space, such readings are converted to hue-saturation-value (HSV) color space. After such conversion, the color classification may be simplified to a two-dimension problem in HSV space. Simple thresholds may then be used for hue and saturation for the purpose of classification of colors.

Although the bandwidth of the light generated by individual LEDs, such as a red LED, is quite narrow, e.g., around 20 nm to 30 nm, the readings from the color sensor usually have significant components from other channels. Averaging the readings over multiple samples fails to reduce the amplitude of readings from other interfering channels. Due to this significant cross talk between different color channels in the color sensor, it is difficult to classify the color from these readings. In addition, there is significant spread between different color sensors from the same batch, and even more so between sensors of different batches.

In order to classify the colors from the readings, proper thresholds need to be set. Due to the cross talk between different channels and spreads between different sensors, the thresholds can work only for some sensors, which in turn can cause the manufacturing yield of the LEDs to drop significantly. To improve the manufacturing yield, there is a need to accurately characterize the color sensors. In addition, a calibration and filtering process may also be used to reduce the cross talk in the system. With proper calibration, the classification accuracy and manufacturing yield is improved significantly.

The present disclosure provides a system and method to confirm that a correct color signal is generated using a color sensor, which detects the light generated by the LED. The readings from the color sensor are calculated for color classification and confirmation by the system. The system and method are configured to characterize the color sensors from different batches and generate a calibration matrix based on linear system theory. With this approach, the readings from the color sensor are first corrected by the calibration matrix, which reduces the systematic errors within the system. After correction, the readings are converted to another color space and are classified into corresponding colors. Based on the characterization data, a Monte Carlo simulation is performed to find proper thresholds for color classification. The presently disclosed system and method improve the yield of the LEDs and the products that used them, e.g., foot pedals, as well as classification accuracy of colors.

The method according to the present disclosure is implemented as software instructions stored in a non-transitory storage media (e.g., local storage, cloud storage, etc.) executable by one or more processors (e.g., CPU, GPU, etc.). A method for generating a calibration matrix includes driving a red LED only with (128, 0, 0), by setting the driving signal of the red LED to the middle level, the green LED to zero, the blue LED to zero, and obtaining and scaling readings against the red channel as [1, Gr/Rr, Br/Rr, Wr]. The method also includes driving green LED only with (0, 128, 0) by setting the driving signal of the red LED to zero, the green LED to the middle level, the blue LED to zero, and obtaining and scaling against the green channel as [Rg/Gg, 1, Bg/Gg, Wg]. The method further includes driving the blue LED only with (0, 0, 128) by setting the driving signal of the red LED to zero, the green LED to zero, the blue LED to middle level, and obtaining and scaling against the blue channel as [Rb/Bb, Gb/Bb, 1, Wb].

The method also includes repeating the above steps for each of a plurality of different foot pedals for N times to obtain N samples of [1, Gr/Rr, Br/Rr, Wr], [Rg/Gg, 1, Bg/Gg, Wg], and [Rb/Bb, Gb/Bb, 1, Wb]. The method further includes calculating the mean and standard deviation of these samples and uses the average of the scaled readings to calculate the calibration matrix for these foot pedals. Alternatively, the calibration matrix may be calculated directly from the data, i.e., without calculating the mean.

In further embodiments, the unscaled readings may be collected as [Rr, Gr, Br, Wr], [Rg, Gg, Bg, Wg], and [Rb, Gb, Bb, Wb]. The method may further include calculating average and standard deviation of these unscaled readings. The method further includes simulating additional colors based on linear theory. Monte Carlo simulation may be used to generate large samples of simulated foot pedals. The data from the simulation may also be used to set proper thresholds for color classification.

A method for determining color classification based on the calibration matrix includes driving an LED to the intended color and obtain readings as [R, G, B, W]. The method also includes calculating corrected readings through a calibration matrix A as [R*, G*, B*]'=abs(A[R, G, B]') and converting [R*, G*, B*] in RGB color space to [H*, S*, V*] in HSV color space. The method further includes applying H*, S* and W thresholds for color classification.

According to one embodiment of the present disclosure, a method for generating a calibration parameter for light sources is disclosed. The method includes activating at least one LED of a plurality of multicolor LEDs of a light source and measuring a color of the at least one LED in a first color space. The method also includes scaling the color of at least one LED relative to the plurality of multicolor LEDs, obtaining a plurality of scaled color measurements, and calculating a calibration matrix based on the plurality of scaled color measurements.

Implementations of the above embodiment may include one or more of the following features. According to one aspect of the above embodiment, the first color space may be a red, green, or blue (RGB) color space and the calibration matrix may be a 3×3 matrix of adjustment values. The method may also include calculating a mean of the plurality of scaled color measurements. The method may further include calculating a standard deviation of the plurality of scaled color measurements. Calculating the calibration matrix may be based on the mean and standard deviation of the plurality of scaled color measurements. The method may additionally include simulating a plurality of simulated color measurements using a Monte Carlo simulation. The method may also include generating a plurality of calibration thresholds in a second color space. The second color space may be a hue, saturation, value (HSV) color space.

According to another embodiment of the present disclosure, a method for calibrating a light source is disclosed. The method includes activating at least one LED of a plurality of multicolor LEDs of a light source and measuring a color of the at least one LED in a first color space. The method further includes converting the measured color using a calibration matrix to a calibrated first color space measurement and then converting the calibrated first color space measurement to second color space values. The method additionally includes comparing the second color space values to thresholds derived from the calibration matrix and outputting a calibration failure message in response to the second color space values exceeding the thresholds.

Implementations of the above embodiment may include one or more of the following features. According to one aspect of the above embodiment, the first color space may be a red, green, blue (RGB) color space. The second color space may be a hue, saturation, value (HSV) color space. The calibration matrix may be a 3×3 matrix of adjustment values. The plurality of multicolor LEDs may be disposed in a foot pedal of a surgeon console for a surgical robotic system.

According to a further embodiment of the present disclosure, a computer-readable medium includes instructions executable by a processor that are configured to cause a computing system to perform a method which includes activating at least one LED of a plurality of multicolor LEDs of a light source. The method also includes measuring the color of at least one LED in a first color space and scaling the color of the at least one LED relative to the plurality of multicolor LEDs. The method further includes obtaining a plurality of scaled color measurements and calculating a calibration matrix based on the plurality of scaled color measurements.

Implementations of the above embodiment may include one or more of the following features. According to one aspect of the above embodiment, the first color space may be a red, green, blue (RGB) color space and the calibration matrix may be a 3×3 matrix of adjustment values. The method may also include calculating a mean of the plurality of scaled color measurements. The method may further include calculating a standard deviation of the plurality of scaled color measurements. Calculating the calibration matrix may be based on the mean and standard deviation of the plurality of scaled color measurements. The method may further include simulating a plurality of simulated color measurements using a Monte Carlo simulation. The method may additionally include generating a plurality of calibration thresholds in a second color space.

DETAILED DESCRIPTION

Figure 1:
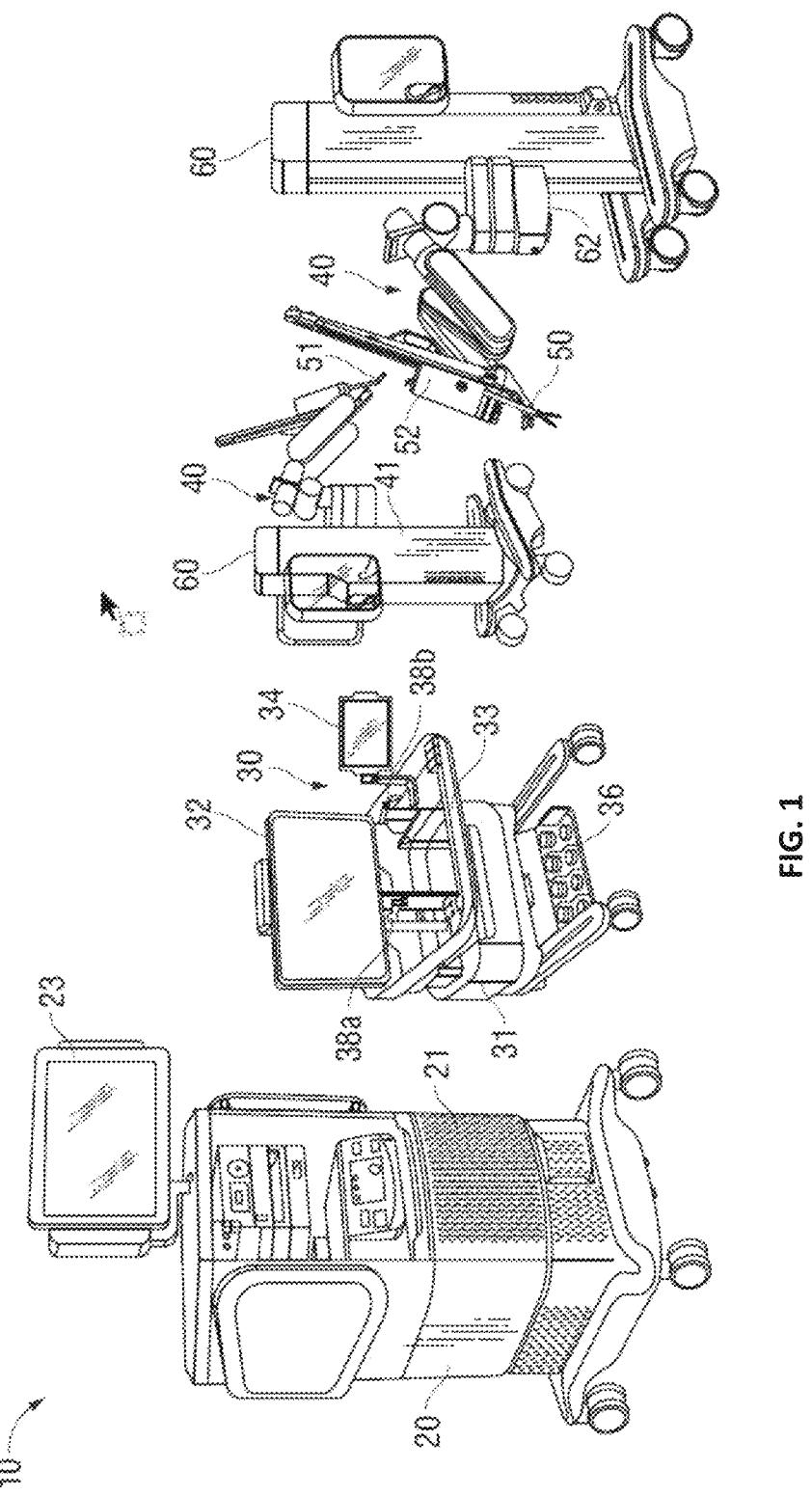
FIG. 1 is a schematic illustration of a surgical robotic system including a control tower, a console, and one or more surgical robotic arms each disposed on a mobile cart according to an embodiment of the present disclosure.

Embodiments of the presently disclosed surgical robotic system are described in detail with reference to the drawings, in which reference numerals designate identical or corresponding elements in each of the several views.

With reference to FIG. 1, a surgical robotic system 10 includes a control tower 20, which is connected to all the components of the surgical robotic system 10 including a surgeon console 30 and one or more mobile carts 60. Each of the mobile carts 60 includes a setup arm 62 holding a robotic arm 40. An instrument drive unit (IDU) 52 is held by the robotic arm 40 and a surgical instrument 50 is removably coupled to the IDU 52. The robotic arms 40 also couple to the mobile carts 60. The robotic system 10 may include any number of mobile carts 60 and/or robotic arms 40.

The surgical instrument 50 is configured for use during minimally invasive surgical procedures. In embodiments, the surgical instrument 50 may be configured for open surgical procedures. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue. In yet further embodiments, the surgical instrument 50 may be a surgical clip applier including a pair of jaws configured apply a surgical clip onto tissue.

One of the robotic arms 40 may include a laparoscopic camera 51 configured to capture video of the surgical site. The laparoscopic camera 51 may be a stereoscopic endoscope configured to capture two side-by-side (i.e., left and right) images of the surgical site to produce a video stream of the surgical scene. The laparoscopic camera 51 is coupled to an image processing device, which may be disposed within the control tower 20 and is configured to receive the video feed from the laparoscopic camera 51 and output the processed video stream.

The surgeon console 30 includes a first screen 32, which displays a video feed of the surgical site provided by camera 51 of the surgical instrument 50 disposed on the robotic arm 40, and a second screen 34, which displays a user interface for controlling the surgical robotic system 10. The first screen 32 and second screen 34 may be touchscreens allowing for displaying various graphical user inputs.

The surgeon console 30 also includes a plurality of user interface devices, such as foot pedals 36 and a pair of hand controllers 38a and 38b which are used by a user to remotely control robotic arms 40. The surgeon console further includes an armrest 33 used to support clinician's arms while operating the hand controllers 38a and 38b.

The control tower 20 includes a screen 23, which may be a touchscreen, and outputs on the graphical user interfaces (GUIs). The control tower 20 also acts as an interface between the surgeon console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgeon console 30, in such a way that robotic arms 40 and the surgical instrument 50 execute a desired movement sequence in response to input from the foot pedals 36 and the hand controllers 38a and 38b. The foot pedals 36 may be used to enable and lock the hand controllers 38a and 38b, repositioning camera movement and electrosurgical activation/deactivation. In particular, the foot pedals 36 may be used to perform a clutching action on the hand controllers 38a and 38b. Clutching is initiated by pressing one of the foot pedals 36, which disconnects (i.e., prevents movement inputs) the hand controllers 38a and/or 38b from the robotic arm 40 and corresponding instrument 50 or camera 51 attached thereto. This allows the user to reposition the hand controllers 38a and 38b without moving the robotic arm(s)

40 and the instrument 50 and/or camera 51. This is useful when reaching control boundaries of the surgical space.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area network, and without limitation as to the full scope of the definition of communication networks as encompassed by this disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth® (an open wireless protocol for exchanging data over short distances, using short length radio waves, from fixed and mobile devices, creating personal area networks (PANs)), and/or ZigBee® (a specification for a suite of high level communication protocols using small, low-power digital radios based on the IEEE 122.15.4-2003 standard for wireless personal area networks (WPANs)).

The computers 21, 31, 41 may include any suitable processor(s) operably connected to a memory, which may include one or more of volatile, non-volatile, magnetic, optical, quantum, and/or electrical media, such as read-only memory (ROM), random access memory (RAM), electrically-erasable programmable ROM (EEPROM), non-volatile RAM (NVRAM), or flash memory. The processor(s) may be any suitable processor(s) (e.g., control circuit(s)) adapted to perform operations, calculations, and/or set of instructions including, but not limited to, a hardware processor, a field programmable gate array (FPGA), a digital signal processor (DSP), a central processing unit (CPU), a microprocessor, a quantum processor, and combinations thereof. Those skilled in the art will appreciate that the processor may be substituted for by using any logic processor (e.g., control circuit) adapted to execute algorithms, calculations, and/or set of instructions.

Figure 2:
FIG. 2 is a perspective view, with parts separated, of a foot pedal according to an embodiment of the present disclosure.
Figure 3:
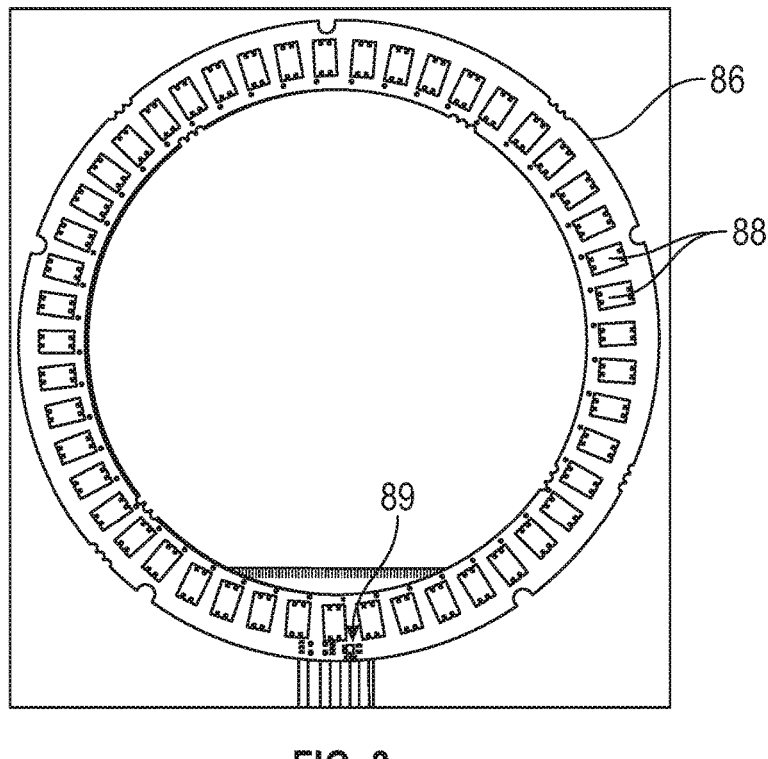
FIG. 3 is a top view of a printed circuit board assembly with LEDs and a color sensor according to an embodiment of the present disclosure.

With reference to FIG. 2, the foot pedal 36 includes a support base 80, a cover 82 disposed over the support base 80. The foot pedal 36 also includes a diffusion layer 84 disposed below the cover 82 and is configured to diffuse the light evenly. A printed circuit board assembly (PCBA) 86 is disposed underneath the diffusion layer 84 and includes a plurality of LEDs 88 arranged in a ring pattern as shown in FIGS. 2 and 3.

Each of the LEDs 88 may include three component LEDs that produce red, green and blue lights independently. When driven with different signals, these three component LEDs together produce the desired color needed. For simplicity, the driving signal is designated as (r, g, b). The PCBA 86 also includes a color sensor 89 as shown in FIG. 3.

Figure 4:
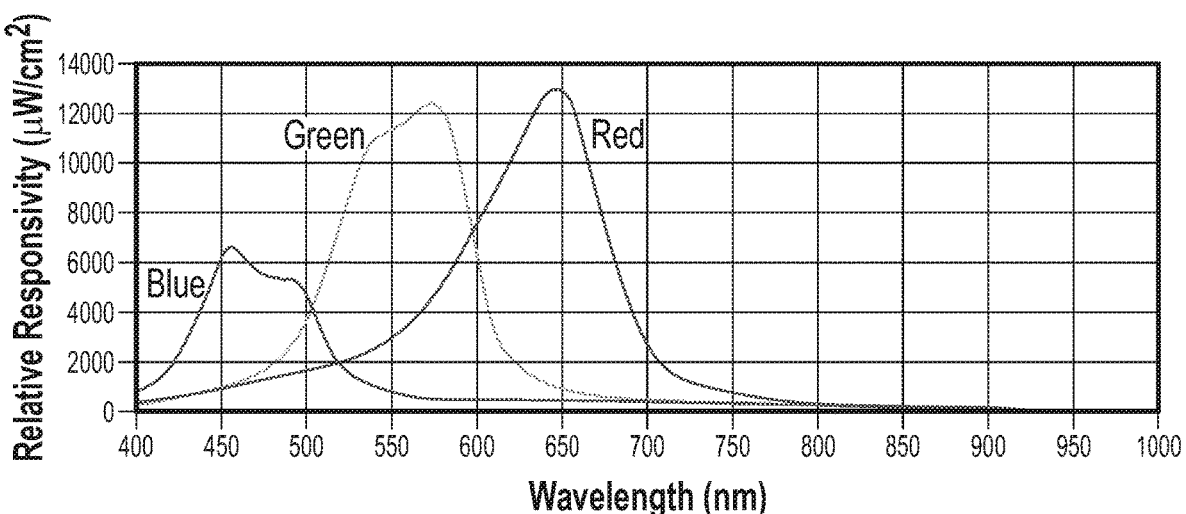
FIG. 4 is a spectrum of sensitivity of the color sensor according to an embodiment of the present disclosure.

The color sensor 89 is configured to sense red, green, blue, and white light. The readings from these channels are designated as [R, G, B, W] corresponding to sensed value from the red, green, blue, and white channels respectively. FIG. 4 shows a spectrum representing spectral sensitivity of the color sensor 89. The spectrum shows spectral overlap between the red, green, and blue. The readings from the color sensor 89 also have components from other channels. For example, even when the component LEDs are driven with (128,0,0) signal, where only the red LEDs are emitting light, the readings from the color sensor may include readings in other channels, e.g., [10763, 3497 2432]. In the example, the strongest response is from the red channel, which is 10763. However, the response from the green and blue channel are 3497 and 2432, respectively, which are significant since only narrow-band red light is emitted.

Similarly, when the component LEDs are driven with (0,128,0) signal, where only green LEDs are emitting light, the readings from the color sensor may be [5973,10319, 2450]. When the component LEDs are driven with (0,0,128) signal, where only the blue LEDs are emitting light, the readings may be [4975,9385,11829]. The crosstalk for the green and blue light may be even more intense than red light. The crosstalk is normally present in the readings and makes the color classification a difficult task. Simple averaging over multiple samples does not eliminate crosstalk from the values. The present disclosure filters the crosstalk through a calibration process.

With continued reference to the exemplary [R, G, B], readings from previous three activations of the LEDs are normalized by corresponding dominant color. After scaling, the readings are [1, 0.3249, 0.2259], [0.5788, 1, 0.2374] and [0.4206, 0.7934, 1] for driving the LED 88 with red, green, and blue, respectively. With the normalized readings, the desired readings are [1, 0, 0], [0, 1, 0] and [0, 0, 1]. Thus, when the red LED is emitting light, the desired readings from the color sensor 89 contain only the components of red channel. The green and blue channels are near zero. Thus, when only green or blue LED is emitting light, the sensor readings are the same, where only the component of the corresponding channel is detected.

Normalized readings may be transferred to desired readings using a matrix A as shown below in formulas (1)-(3).

$$A\begin{bmatrix} 1 \\ 0.3249 \\ 0.2259 \end{bmatrix} = \begin{bmatrix} 1 \\ 0 \\ 0 \end{bmatrix} \quad (1)$$

$$A\begin{bmatrix} 0.5788 \\ 1 \\ 0.2374 \end{bmatrix} = \begin{bmatrix} 0 \\ 1 \\ 0 \end{bmatrix} \quad (2)$$

$$A\begin{bmatrix} 0.4206 \\ 0.7934 \\ 1 \end{bmatrix} = \begin{bmatrix} 0 \\ 0 \\ 1 \end{bmatrix} \quad (3)$$

Formulas (1)-(3) may also be expressed as following formulas (4)-(6).

$$AX_1 = Y_1 \quad (4)$$

$$AX_2 = Y_2 \quad (5)$$

$$AX_3 = Y_3 \quad (6)$$

Formulas (4)-(6) may be further expressed as matrix formulas (7)-(9).

$$\begin{bmatrix} a_{11} & a_{12} & a_{13} \\ a_{21} & a_{22} & a_{23} \\ a_{31} & a_{32} & a_{33} \end{bmatrix}\begin{bmatrix} x_{11} \\ x_{12} \\ x_{13} \end{bmatrix} = \begin{bmatrix} y_{11} \\ y_{12} \\ y_{13} \end{bmatrix} \quad (7)$$

$$\begin{bmatrix} a_{11} & a_{12} & a_{13} \\ a_{21} & a_{22} & a_{23} \\ a_{31} & a_{32} & a_{33} \end{bmatrix}\begin{bmatrix} x_{21} \\ x_{22} \\ x_{23} \end{bmatrix} = \begin{bmatrix} y_{21} \\ y_{22} \\ y_{23} \end{bmatrix} \quad (8)$$

$$\begin{bmatrix} a_{11} & a_{12} & a_{13} \\ a_{21} & a_{22} & a_{23} \\ a_{31} & a_{32} & a_{33} \end{bmatrix}\begin{bmatrix} x_{31} \\ x_{32} \\ x_{33} \end{bmatrix} = \begin{bmatrix} y_{31} \\ y_{32} \\ y_{33} \end{bmatrix} \quad (9)$$

Formulas (7)-(9) may then be merged into a single formula (10) below.

$$\begin{bmatrix} x_{11} & x_{12} & x_{13} & 0 & 0 & 0 & 0 & 0 & 0 \\ 0 & 0 & 0 & x_{11} & x_{12} & x_{12} & 0 & 0 & 0 \\ 0 & 0 & 0 & 0 & 0 & 0 & x_{11} & x_{12} & x_{13} \\ x_{21} & x_{22} & x_{23} & 0 & 0 & 0 & 0 & 0 & 0 \\ 0 & 0 & 0 & x_{21} & x_{22} & x_{23} & 0 & 0 & 0 \\ 0 & 0 & 0 & 0 & 0 & 0 & x_{21} & x_{22} & x_{23} \\ x_{31} & x_{32} & x_{33} & 0 & 0 & 0 & 0 & 0 & 0 \\ 0 & 0 & 0 & x_{31} & x_{32} & x_{33} & 0 & 0 & 0 \\ 0 & 0 & 0 & 0 & 0 & 0 & x_{31} & x_{32} & x_{33} \end{bmatrix}\begin{bmatrix} a_{11} \\ a_{12} \\ a_{13} \\ a_{21} \\ a_{22} \\ a_{23} \\ a_{31} \\ a_{32} \\ a_{33} \end{bmatrix} = \begin{bmatrix} y_{11} \\ y_{12} \\ y_{13} \\ y_{21} \\ y_{22} \\ y_{23} \\ y_{31} \\ y_{32} \\ y_{33} \end{bmatrix} \quad (10)$$

Formula (10) may be rewritten and solved as formula (11).

$$\begin{bmatrix} a_{11} \\ a_{12} \\ a_{13} \\ a_{21} \\ a_{22} \\ a_{23} \\ a_{31} \\ a_{32} \\ a_{33} \end{bmatrix} = \begin{bmatrix} x_{11} & x_{12} & x_{13} & 0 & 0 & 0 & 0 & 0 & 0 \\ 0 & 0 & 0 & x_{11} & x_{12} & x_{13} & 0 & 0 & 0 \\ 0 & 0 & 0 & 0 & 0 & 0 & x_{11} & x_{12} & x_{13} \\ x_{21} & x_{22} & x_{23} & 0 & 0 & 0 & 0 & 0 & 0 \\ 0 & 0 & 0 & x_{21} & x_{22} & x_{23} & 0 & 0 & 0 \\ 0 & 0 & 0 & 0 & 0 & 0 & x_{21} & x_{22} & x_{23} \\ x_{31} & x_{32} & x_{33} & 0 & 0 & 0 & 0 & 0 & 0 \\ 0 & 0 & 0 & x_{31} & x_{32} & x_{33} & 0 & 0 & 0 \\ 0 & 0 & 0 & 0 & 0 & 0 & x_{31} & x_{32} & x_{33} \end{bmatrix}^{-1}\begin{bmatrix} y_{11} \\ y_{12} \\ y_{13} \\ y_{21} \\ y_{22} \\ y_{23} \\ y_{31} \\ y_{32} \\ y_{33} \end{bmatrix} \quad (11)$$

Plugging in the numbers from formulas (1), (2), and (3) into formula (11), a calibration matrix A is then defined by formula (12).

$$A = \begin{bmatrix} 1.2210 & -0.7206 & 0.0582 \\ -0.2191 & 1.3614 & -0.9880 \\ -0.2239 & -0.1604 & 1.2214 \end{bmatrix} \quad (12)$$

The calibration matrix A may then be applied to the [R, G, B] readings prior to normalization. As an example, the initial readings are [10763, 3497, 2432], [5973, 10319, 2450] and [4975, 9385, 11829], respectively. The following formulas (13)-(15) show the corrected (i.e., calibrated) readings after applying the calibration matrix A to the readings from the color sensor 89.

$$\begin{bmatrix} 1.2210 & -0.7206 & 0.0582 \\ -0.2191 & 1.3614 & -0.9880 \\ -0.2239 & -0.1604 & 1.2214 \end{bmatrix}\begin{bmatrix} 10673 \\ 3497 \\ 2432 \end{bmatrix} = \begin{bmatrix} 10673 \\ 0 \\ 0 \end{bmatrix} \quad (13)$$

$$\begin{bmatrix} 1.2210 & -0.7206 & 0.0582 \\ -0.2191 & 1.3614 & -0.9880 \\ -0.2239 & -0.1604 & 1.2214 \end{bmatrix}\begin{bmatrix} 5973 \\ 10319 \\ 2450 \end{bmatrix} = \begin{bmatrix} 0 \\ 10319 \\ 0 \end{bmatrix} \quad (14)$$

$$\begin{bmatrix} 1.2210 & -0.7206 & 0.0582 \\ -0.2191 & 1.3614 & -0.9880 \\ -0.2239 & -0.1604 & 1.2214 \end{bmatrix}\begin{bmatrix} 4975 \\ 9385 \\ 11829 \end{bmatrix} = \begin{bmatrix} 0 \\ 0 \\ 11829 \end{bmatrix} \quad (15)$$

As shown in (13), (14), and (15), after applying the calibration matrix A, the undesired systematic crosstalk can be filtered out from the color sensor readings. When the component LEDs are driven individually, desired calibration results are obtained. Similarly, when the component LEDs are driven with an arbitrary (r, g, b) signal, the calibration matrix may still be used given the following assumptions. First, the luminous intensity from each component LED changes linearly with the drive signal, the LED is driven in the linear range, and the light output changes linearly with driven current. Second, the readings from the color sensor 89 changes linearly with light intensity. Third, the bandwidth of the LED light is narrow and there is little spectral overlap between red, green, and blue light emitted by these LEDs. The bandwidth of the LED light may be around 20-30 nm. The central wavelength of the red, green, and blue light may be 632, 527 and 470 nm, respectively. Thus, when only red component LED is emitting, the desired reading would have the component from red channel; components in green and blue channels are close to zero.

Under these assumptions, we can define the linear system as L, the LED drive signal as D, and the readings as S. When the component LEDs are driven individually with signal (128,0,0), (0,128,0) and (0,0,128), the system response may be modeled as follows in formulas (16)-(18).

$$D_r=[128\ 0\ 0]'=>S_r=L(D_r)=X_1 \tag{16}$$

$$D_g=[0\ 128\ 0]'=>S_g=L(D_g)=X_2 \tag{17}$$

$$D_b=[0\ 0\ 128]'=>S_b=L(D_b)=X_3 \tag{18}$$

When the LEDs are driven with an arbitrary (r, g, b) signal, the input can be modeled using the formula (19).

$$D=[r\ g\ b]'=\alpha D_r+\beta D_g+\gamma D_b=128[\alpha\ \beta\ \gamma]' \tag{19}$$

Applying the linear systems principle, the output from the system may be modeled by the formula (20).

$$S=L(D)=\alpha X_1+\beta X_2+\gamma X_3 \tag{20}$$

Applying the calibration matrix A to the output, the result is expressed by the formula (21).

$$AS=A(\alpha X_1+\beta X_2+\gamma X_3) \tag{21}$$

For individually driven red, green; and blue LEDs, the calibration matrix A can filter out the systematic crosstalk, as shown in formulas (13), (14) and (15). Those results may be generically modeled as equations (22)-(24).

$$AX_1=[R\ 0\ 0]' \tag{22}$$

$$AX_2=[0\ G\ 0]' \tag{23}$$

$$AX_3=[0\ 0\ B]' \tag{24}$$

Plugging in formulas (22)-(24) into formula (21) results in formula (25).

$$AS=[\alpha R\ \beta G\ \gamma B]' \tag{25}$$

Assuming the response for individually driven component red, green, blue LEDs are approximately equal, then intensity may be expressed by formula (26).

$$c=R\approx G\approx B \tag{26}$$

After applying the calibration matrix, the original driver signal in formula (19) may be obtained as formula (27).

$$AS=c[\alpha\ \beta\ \gamma]' \tag{27}$$

The above analysis is applicable to a single foot pedal 36 with the calibration matrix as defined in formula (10). The calibration matrix for N number of foot pedals 36 may be expressed as formula (28).

$$\begin{bmatrix} x_{11}^1 & x_{12}^1 & x_{13}^1 & 0 & 0 & 0 & 0 & 0 & 0 \\ 0 & 0 & 0 & x_{11}^1 & x_{12}^1 & x_{13}^1 & 0 & 0 & 0 \\ 0 & 0 & 0 & 0 & 0 & 0 & x_{11}^1 & x_{12}^1 & x_{13}^1 \\ x_{21}^1 & x_{22}^1 & x_{23}^1 & 0 & 0 & 0 & 0 & 0 & 0 \\ 0 & 0 & 0 & x_{21}^1 & x_{22}^1 & x_{23}^1 & 0 & 0 & 0 \\ 0 & 0 & 0 & 0 & 0 & 0 & x_{21}^1 & x_{22}^1 & x_{23}^1 \\ x_{31}^1 & x_{32}^1 & x_{33}^1 & 0 & 0 & 0 & 0 & 0 & 0 \\ 0 & 0 & 0 & x_{31}^1 & x_{32}^1 & x_{33}^1 & 0 & 0 & 0 \\ 0 & 0 & 0 & 0 & 0 & 0 & x_{31}^1 & x_{32}^1 & x_{33}^1 \\ & & & & \ddots & & & & \\ x_{11}^N & x_{12}^N & x_{13}^N & 0 & 0 & 0 & 0 & 0 & 0 \\ 0 & 0 & 0 & x_{11}^N & x_{11}^N & x_{13}^N & 0 & 0 & 0 \\ 0 & 0 & 0 & 0 & 0 & 0 & x_{11}^N & x_{11}^N & x_{13}^N \\ x_{21}^N & x_{22}^N & x_{23}^N & 0 & 0 & 0 & 0 & 0 & 0 \\ 0 & 0 & 0 & x_{21}^N & x_{22}^N & x_{23}^N & 0 & 0 & 0 \\ 0 & 0 & 0 & 0 & 0 & 0 & x_{21}^N & x_{22}^N & x_{23}^N \\ x_{31}^N & x_{32}^N & x_{33}^N & 0 & 0 & 0 & 0 & 0 & 0 \\ 0 & 0 & 0 & x_{31}^N & x_{32}^N & x_{33}^N & 0 & 0 & 0 \\ 0 & 0 & 0 & 0 & 0 & 0 & x_{31}^N & x_{32}^N & x_{33}^N \end{bmatrix} \begin{bmatrix} a_{11} \\ a_{12} \\ a_{13} \\ a_{21} \\ a_{22} \\ a_{23} \\ a_{31} \\ a_{32} \\ a_{33} \end{bmatrix} = \begin{bmatrix} y_{11}^1 \\ y_{12}^1 \\ y_{13}^1 \\ y_{21}^1 \\ y_{22}^1 \\ y_{23}^1 \\ y_{31}^1 \\ y_{32}^1 \\ y_{33}^1 \\ \vdots \\ y_{11}^N \\ y_{12}^N \\ y_{13}^N \\ y_{21}^N \\ y_{22}^N \\ y_{23}^N \\ y_{31}^N \\ y_{32}^N \\ y_{33}^N \end{bmatrix} \tag{28}$$

The above formula (28) is over-constrained as there nine (9) unknowns, and 9N linear equations. The formula (28) may be simplified, and the matrix dimensions may be explicitly written in formula (29).

$$M_{9N\times9}L_{9\times1}=K_{9N\times1} \tag{29}$$

This optimal solution to the formula (29) may be expressed as a least-square solution in formula (30).

$$L=(M'M)^{-1}M'K \tag{30}$$

The above solution is obtained by the pseudo-inverse of the matrix M due to the fact the equation is over-constrained. An alternative way to calculate the calibration matrix for N different foot pedals 36 is to calculate the average of normalized readings for formula (10). Then the calibration matrix may be calculated using the formula (31) where $x^*_{i,j}$ is the average of the normalized readings over N samples.

$$\begin{bmatrix} a_{11} \\ a_{12} \\ a_{13} \\ a_{21} \\ a_{22} \\ a_{23} \\ a_{31} \\ a_{32} \\ a_{33} \end{bmatrix} = \begin{bmatrix} x_{11}^* & x_{12}^* & x_{13}^* & 0 & 0 & 0 & 0 & 0 & 0 \\ 0 & 0 & 0 & x_{11}^* & x_{12}^* & x_{13}^* & 0 & 0 & 0 \\ 0 & 0 & 0 & 0 & 0 & 0 & x_{11}^* & x_{12}^* & x_{13}^* \\ x_{21}^* & x_{22}^* & x_{23}^* & 0 & 0 & 0 & 0 & 0 & 0 \\ 0 & 0 & 0 & x_{21}^* & x_{22}^* & x_{23}^* & 0 & 0 & 0 \\ 0 & 0 & 0 & 0 & 0 & 0 & x_{21}^* & x_{22}^* & x_{23}^* \\ x_{31}^* & x_{32}^* & x_{33}^* & 0 & 0 & 0 & 0 & 0 & 0 \\ 0 & 0 & 0 & x_{31}^* & x_{32}^* & x_{33}^* & 0 & 0 & 0 \\ 0 & 0 & 0 & 0 & 0 & 0 & x_{31}^* & x_{32}^* & x_{33}^* \end{bmatrix}^{-1} \begin{bmatrix} y_{11} \\ y_{12} \\ y_{13} \\ y_{21} \\ y_{22} \\ y_{23} \\ y_{31} \\ y_{32} \\ y_{33} \end{bmatrix} \tag{31}$$

Figure 5:
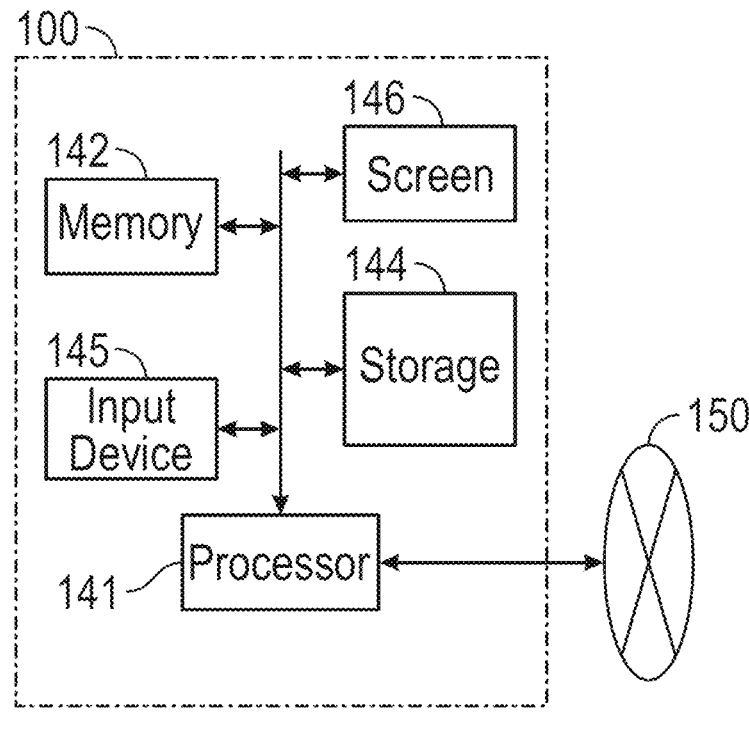
FIG. 5 is a schematic diagram of a computing device for color sensor characterization, calibration, and threshold-setting according to an embodiment of the present disclosure.

With reference to FIG. 5, a computing device 100 for color sensor characterization, calibration, and threshold-setting may be configured to communicate with a network 150 such as a backbone LAN (local area network). The computing device 100 includes a processor 141, a memory 142, a storage device 144, an input device 145, and a display screen 146. The processor 141 is connected to each of the hardware components constituting the computing device 100.

The input device 145 may be any suitable user input device such as a keyboard, a touch screen, or a pointing device that can be operated by the operator and send input signals according to an operation to the processor 141. The processor 141 may be configured to perform operations, calculations, and/or sets of instructions described in the disclosure and may be a hardware processor, a field programmable gate array (FPGA), a digital signal processor (DSP), a central processing unit (CPU), a microprocessor, and combinations thereof. If an instruction is input by an operator such as a physician operating the input device 145, the processor 141 executes a program stored in the memory 142. The processor 141 is configured to load software instructions stored in the storage device 144 and/or transferred from the network 150 or a removable storage device (not shown) into the memory 142 to execute such instructions. The memory 142 may be a transitory storage device such as RAM (random access memory) and the like and is used as working memory for the processor 141 and used to temporarily store data.

The storage device 144 is a non-transitory storage device, e.g., hard disc drive, flash storage, etc. The storage device 144 is a storage device in which programs installed in the computing device 100 (including an application program as well as an OS (operating system)) and data are stored. Also, the OS provides a GUI (graphical user interface) that displays information to the operator so that the operator can perform operations through the input device 145. The screen 146 may be any suitable monitor and may include a touchscreen that is configured to display the GUI.

Figure 6:
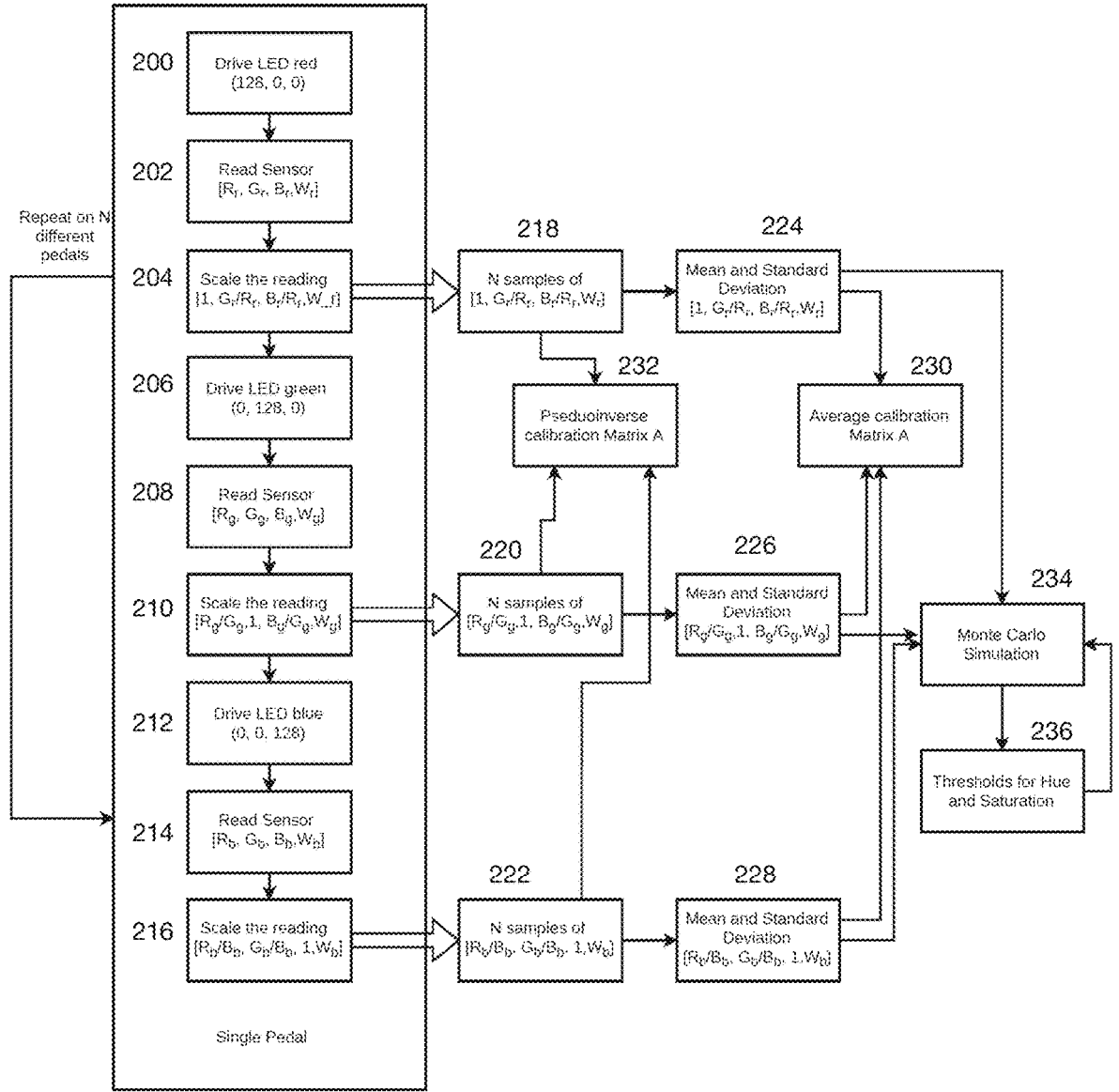
FIG. 6 is a flowchart of a method for generating a calibration matrix for calibrating a color sensor according to an embodiment of the present disclosure.

The methods for calibrating LEDs 88 of the foot pedals 36 according to the present disclosure are implemented as software instructions stored in the storage device 144 and executable by the processor 141 of the computing device 100. With reference to FIG. 6, a method for generating a calibration matrix includes driving red LED only with (128, 0, 0) at step 200, by setting the driving signal of the red LED to the middle level, the green LED to zero, the blue LED to zero, and obtaining the color measurement at step 202 at the color sensor 209. The measurements are then scaled against the red channel as [1, Gr/Rr, Br/Rr, Wr] at step 204. The method also includes driving the green LED only with (0, 128, 0) signal at step 206, by setting the driving signal of the red LED to zero, the green LED to the middle level, the blue LED to zero. At step 208, the color measurement is obtained and scaled against the green channel as [Rg/Gg, 1, Bg Gg, Wg] at step 210. The method further includes driving the blue LED only with (0, 0, 128) at step 212 by setting the driving signal of the red LED to zero, the green LED to zero, the blue LED to middle level. At step 214, the color measurement is obtained at the color sensor 89 and the measurement is scaled against the blue channel as [Rb/Bb, Gb/Bb, 1, Wb] at step 216.

Steps 200-216 may be repeated for each of a plurality of different foot pedals 36 for N number of times to obtain N samples of [1, Gr/Rr, Br/Rr, Wr], [Rg/Gg, 1, Bg/Gg, Wg], and [Rb/Bb, Gb Bb, 1, Wb], at steps 218, 220, and 222, respectively. The method further includes calculating the mean and standard deviation of these samples at steps 224, 226, 228, respectively. At step 230, the average of the scaled readings is used to calculate the calibration matrix for the foot pedals 36 using the formula (31) above.

Alternatively, the calibration matrix, i.e., pseudoinverse calibration matrix, may be calculated directly from the data, i.e., without calculating the mean at step 232. The unscaled readings can be collected as [Rr, Gr, Br, Wr], [Rg, Gg, Bg, Wg], and [Rb, Gb, Bb, Wb]. The method may further include calculating an average and standard deviation of these unscaled readings. The method also includes simulating additional colors based on linear theory. Monte Carlo simulation may then be used at step 234 to generate large samples of simulated foot pedals. At step 236, the data from the simulations is then used to generate thresholds for color classification. The thresholds are based on hue and saturation [H, S, W] by converting RGB values from the calibration matrix.

Figure 7:
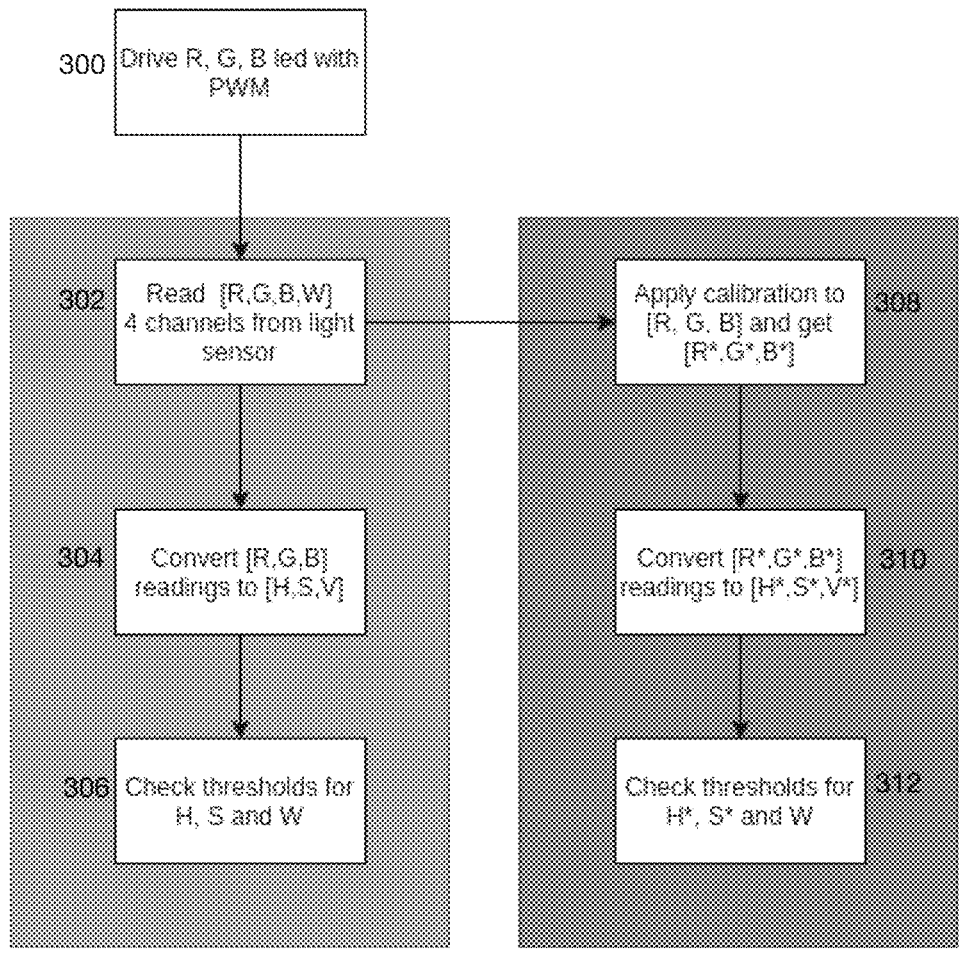
FIG. 7 is a flowchart of a method for color classification using the calibration matrix according to an embodiment of the present disclosure.

With reference to FIG. 7, a method for determining color classification of the foot pedal 36 based on the calibration matrix includes driving the LED 88 of the foot pedal 36 to the intended color at step 300 and obtaining color measurements as [R, G, B, W] at step 302. The measured color in [R, G, B] color space is converted to [H, S, V] color space at step 304 and then compared to [H, S, W] thresholds at step 306. If the converted color measurements are above the threshold, then the computing device 100 may output an alert that the color reproduction of the foot pedal is not accurate.

The method also includes calculating corrected readings through a calibration matrix as [R*, G*, B*]'=abs(A[R, G, B]') at step 308 and converting [R*, G*, B*] in RGB color space to [H*, S*, V*] in HSV color space at step 310. The method further includes applying H*, S*, and W thresholds for color classification at step 312. If the converted color measurements are above the threshold, then the computing device 100 may output an alert that the color reproduction of the foot pedal is not accurate. The method of FIG. 7 may be performed during the manufacturing process to ensure accurate color of the foot pedal 36.

In one embodiment, five different colors may be generated to differentiate different foot pedals. 36 The color and corresponding drive signal of the LEDs 88 are listed in the flowing table 1.

TABLE 1

| Color | Drive Signal |
|---|---|
| blue | (0, 0, 255) |
| yellow | (192, 192, 0) |
| green | (0, 235, 16) |
| magenta | (128, 0, 128) |
| white | (170, 170, 170) |

Figure 8:
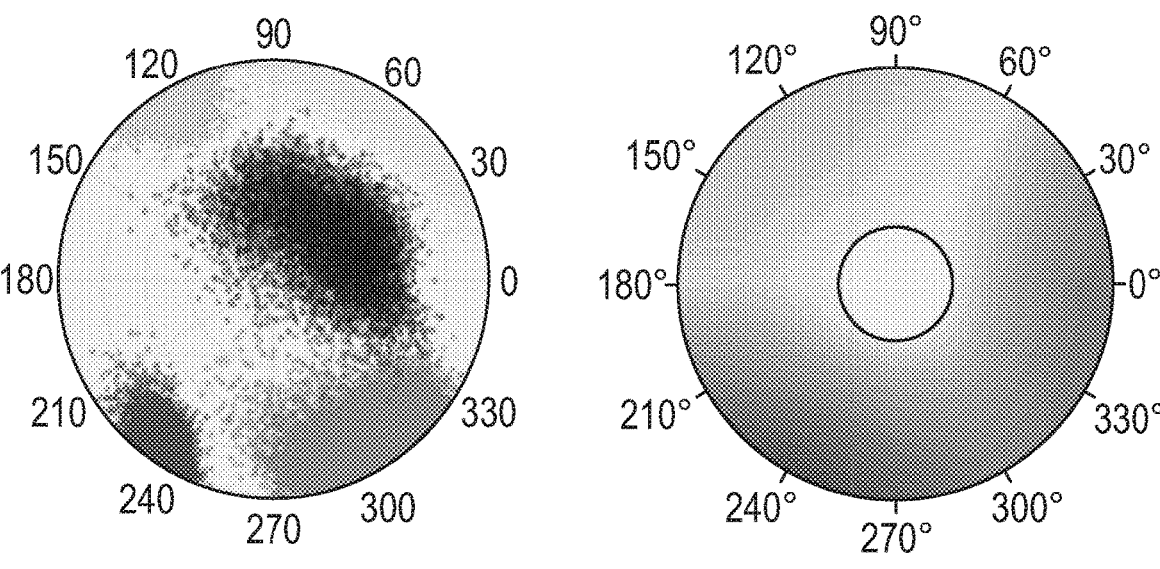
FIG. 8 is a hue-saturation distribution before correction using the method according to one embodiment of the present disclosure.

In order to properly set the classification threshold in the HSV color space, Monte Carlo simulation may be performed based on the statistic distribution of [Rr, Gr, Br, Wr], [Rg, Gg, Bg, Wg], and [Rb, Gb, Bb, Wb] as defined in previous steps. For example, around 100 such samples may be collected. Based on these samples, around 10,000 foot pedals 36 may be simulated to explore the spreads of parameters. For these simulated samples, the distribution of the five colors before correction in the hue saturation plane is shown in FIG. 8. These distributions are calculated directly from the simulated readings without applying the calibration matrix. All the colors are clustered close to the center (left figure) instead of the edge of the color ring (right figure). This is due to crosstalk in the readings, which skews the color significantly.

Figure 9:
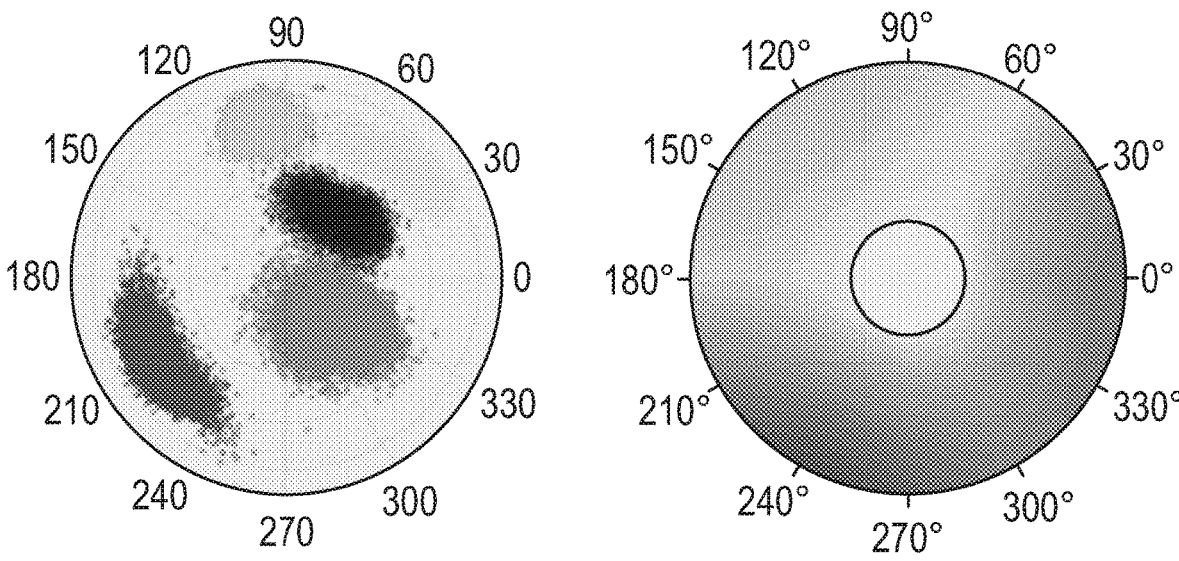
FIG. 9 is hue-saturation distribution after correction using the method according to one embodiment of the present disclosure.

After applying the calibration matrix, which is derived from the 100 samples, the distribution of the colors after correction in the hue-saturation plane is shown in FIG. 9. The distribution of those four colors is much closer to the edge of the color ring, and white is closer to the center. These distributions are closer to standard color distribution, which is displayed on the right side of the figure.

Figure 10:
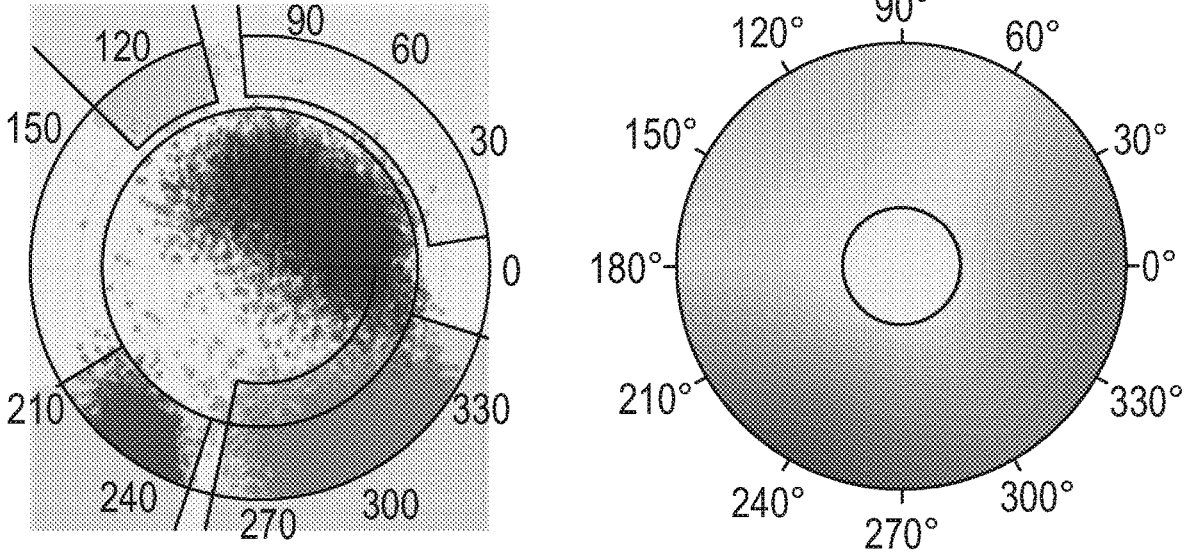
FIG. 10 is a threshold for color classification in a hue-saturation plane according to one embodiment of the present disclosure.

From the distribution in the hue-saturation plane after applying the calibration matrix, and the statistical analysis of the corrected [H*, S*, V*], it is straightforward to set up the classification thresholds for hue and saturation. FIG. 10 shows one such example for the thresholds. With such thresholds, the projected manufacturing yield of the foot pedals 36 and accuracy of the classification accuracy are summarized in the following table 2.

TABLE 2

| metric | method | magenta | blue | yellow | green | white |
|---|---|---|---|---|---|---|
| accuracy | prior | 69.61 | 99.52 | 99.52 | 97.21 | 94.98 |
| accuracy | proposed | 98.73 | 99.65 | 99.72 | 99.39 | 97.48 |
| yield | prior | 69.61 | 99.52 | 99.52 | 98.06 | 94.98 |
| yield | proposed | 98.73 | 99.65 | 99.72 | 99.39 | 99.30 |

Table 2 demonstrates that applying a calibration matrix can significantly improve the accuracy and yield for some colors. Furthermore, this simulation is based on samples that already passed the quality check. Only less than 5 percent of the samples are drawn from failed units. For some specific batches, when calibration matrix is generated from that population, it can improve the classification accuracy and manufacturing yield even more dramatically.

While the present calibration disclosure was described with respect to foot pedals of a surgical robotic system, the color calibration and verification methods disclosed herein may be used to verify color accuracy of any LED-based light source.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A method for generating a calibration parameter for light sources, the method comprising:
    activating at least one LED of a plurality of multicolor LEDs of a light source;
    measuring a color of the at least one LED in a first color space;
    normalizing the measured color of the at least one LED by dividing each channel component by a dominant channel component of the at least one LED, the dominant channel component corresponding to the activated LED, to obtain a normalized reading;
    obtaining a plurality of normalized readings; and
    calculating a calibration matrix based on the plurality of normalized readings, the calibration matrix configured to map each normalized reading of the plurality of normalized readings to a desired reading that includes only the dominant channel component.

2. The method according to claim 1, wherein the first color space is a red, green, blue (RGB) color space and the calibration matrix is a 3×3 matrix of adjustment values.

3. The method according to claim 1, further comprising:
    calculating a mean of the plurality of normalized readings.

4. The method according to claim 3, further comprising:
    calculating a standard deviation of the plurality of normalized readings.

5. The method according to claim 4, wherein calculating the calibration matrix is based on the mean and standard deviation of the plurality of normalized readings.

6. The method according to claim 1, further comprising simulating a plurality of simulated color measurements using a Monte Carlo simulation.

7. The method according to claim 1, further comprising:
    generating a plurality of calibration thresholds in a second color space.

8. The method according to claim 7, wherein the second color space is a hue, saturation, value (HSV) color space.

9. A method for calibrating a light source, the method comprising:
    activating at least one LED of a plurality of multicolor LEDs of a light source;
    measuring a color of the at least one LED in a first color space;
    normalizing the measured color of the at least one LED by dividing each channel component by a dominant channel component of the at least one LED to obtain a normalized reading, the dominant channel component corresponding to the activated LED;
    obtaining a plurality of normalized readings;
    converting the normalized reading using a calibration matrix to a calibrated first color space measurement, wherein the calibration matrix is based on the plurality of normalized readings and is configured to map each normalized reading of the plurality of normalized readings to a desired reading that includes only the dominant channel component;
    converting the calibrated first color space measurement to a value of a second color space;
    comparing the value of the second color space to a threshold derived from the calibration matrix; and
    outputting a calibration failure message in response to the value of the second color space exceeding the threshold.

10. The method according to claim 9, wherein the first color space is a red, green, blue (RGB) color space.

11. The method according to claim 9, wherein the second color space is a hue, saturation, value (HSV) color space.

12. The method according to claim 9, wherein the calibration matrix is a 3×3 matrix of adjustment values.

13. The method according to claim 9, wherein the plurality of multicolor LEDs are disposed in a foot pedal of a surgeon console for a surgical robotic system.

14. A non-transitory computer-readable storage medium including instructions executable by a processor that are configured to cause a computing system to perform a method comprising:
    activating at least one LED of a plurality of multicolor LEDs of a light source;
    measuring a color of the at least one LED in a first color space;
    normalizing the measured color of the at least one LED by dividing each channel component by a dominant channel component of the at least one LED, the dominant channel component corresponding to the activated LED, to obtain a normalized reading;
    obtaining a plurality of normalized readings; and
    calculating a calibration matrix based on the plurality of normalized readings, the calibration matrix configured to map each normalized reading of the plurality of normalized readings to a desired reading that includes only the dominant channel component.

15. The non-transitory computer-readable storage medium according to claim 14, wherein the first color space is a red, green, blue (RGB) color space and the calibration matrix is a 3×3 matrix of adjustment values.

16. The non-transitory computer-readable storage medium according to claim 14, wherein the method further comprises:
    calculating a mean of the plurality of normalized readings.

17. The non-transitory computer-readable storage medium according to claim 16, wherein the method further comprises:

calculating a standard deviation of the plurality of normalized readings.

18. The non-transitory computer-readable storage medium according to claim 17, wherein calculating the calibration matrix is based on the mean and standard deviation of the plurality of normalized readings.

19. The non-transitory computer-readable storage medium according to claim 14, wherein the method further comprises simulating a plurality of simulated color measurements using a Monte Carlo simulation.

20. The non-transitory computer-readable storage medium according to claim 14, wherein the method further comprises:

generating a plurality of calibration thresholds in a second color space.

* * * * *